(12) United States Patent
Kato

(10) Patent No.: US 11,031,180 B2
(45) Date of Patent: Jun. 8, 2021

(54) MULTI-LAYER CERAMIC ELECTRONIC COMPONENT AND METHOD OF PRODUCING THE SAME

(71) Applicant: Taiyo Yuden Co., Ltd., Tokyo (JP)

(72) Inventor: Yoichi Kato, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/212,015

(22) Filed: Dec. 6, 2018

(65) Prior Publication Data

US 2019/0180935 A1 Jun. 13, 2019

(30) Foreign Application Priority Data

Dec. 11, 2017 (JP) .............................. JP2017-237062

(51) Int. Cl.
| | |
|---|---|
| *H01G 4/012* | (2006.01) |
| *H01G 4/30* | (2006.01) |
| *H01G 4/14* | (2006.01) |
| *H01G 4/224* | (2006.01) |
| *H01G 4/232* | (2006.01) |
| *H01G 4/008* | (2006.01) |
| *H01G 4/12* | (2006.01) |
| *H01G 4/248* | (2006.01) |

(52) U.S. Cl.
CPC ............... *H01G 4/012* (2013.01); *H01G 4/14* (2013.01); *H01G 4/224* (2013.01); *H01G 4/30* (2013.01); *H01G 4/008* (2013.01); *H01G 4/1227* (2013.01); *H01G 4/1236* (2013.01); *H01G 4/1245* (2013.01); *H01G 4/2325* (2013.01); *H01G 4/248* (2013.01)

(58) Field of Classification Search
CPC ........ H01G 4/012; H01G 4/1227; H01G 4/33; H01G 4/248; H01G 4/224; H01G 4/2325; H01G 4/30; H01G 4/14; H01G 4/008; H01G 4/1236; H01G 4/1245
See application file for complete search history.

(56) References Cited

U.S. PATENT DOCUMENTS

| | | | |
|---|---|---|---|
| 2012/0234462 A1 | 9/2012 | Matsui et al. | |
| 2014/0301015 A1* | 10/2014 | Kim | H01G 4/30 361/301.4 |

FOREIGN PATENT DOCUMENTS

JP 2012-209539 A 10/2012

* cited by examiner

*Primary Examiner* — Michael P McFadden
(74) *Attorney, Agent, or Firm* — Saliwanchik, Lloyd & Eisenschenk

(57) ABSTRACT

A multi-layer ceramic electronic component includes a multi-layer unit and a side margin. The multi-layer unit includes ceramic layers laminated in a first direction, internal electrodes disposed between the ceramic layers, a main surface that faces in the first direction, and a side surface that faces in a second direction orthogonal to the first direction, the internal electrodes being exposed from the side surface. The side margin includes a side-surface-covering portion that is disposed on the side surface, and an end portion that extends from the side-surface-covering portion to an upper side of the main surface, the end portion having a lower porosity than a porosity of the side-surface-covering portion, the end portion being rounded.

3 Claims, 8 Drawing Sheets

MULTI-LAYER CERAMIC ELECTRONIC COMPONENT AND METHOD OF PRODUCING THE SAME

CROSS-REFERENCE TO RELATED APPLICATION

This application claims the benefit under 35 U.S.C. § 119 of Japanese Application No. 2017-237062 filed Dec. 11, 2017, which is hereby incorporated in its entirety.

BACKGROUND

The present disclosure relates to a multi-layer ceramic electronic component including side margins provided in a subsequent step, and to a method of producing the multi-layer ceramic electronic component.

In recent years, along with miniaturization of electronic devices and achievement of high performance thereof, there have been increasingly strong demands for miniaturization and increase in capacitance with respect to multi-layer ceramic capacitors used in the electronic devices. In order to meet those demands, it is effective to enlarge internal electrodes of the multi-layer ceramic capacitor. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Therefore, in such a method of producing a multi-layer ceramic capacitor, as the side margins are made thinner, it is more difficult to ensure insulation properties of the periphery of the internal electrodes.

Japanese Patent Application Laid-open No. 2012-209539 discloses a technique of providing side margins in a subsequent step. In other words, in this technique, a multi-layer sheet is cut to produce a multi-layer unit whose internal electrodes are exposed from the side surfaces of the multi-layer unit, and side margins are provided to the side surfaces. This enables side margins having a uniform thickness to be formed and thus enables insulation properties of the periphery of the internal electrodes to be ensured also when the side margins are made thin.

SUMMARY

In the multi-layer ceramic capacitor including the side margins provided in a subsequent step, moisture is likely to infiltrate along a gap between the side surface of the multi-layer unit and the side margin. Further, as the side margin is made thinner, moisture is more likely to pass through the side margin in the thickness direction thereof and reach the side surface of the multi-layer unit. This makes it difficult to ensure insulation properties between the internal electrodes, which are exposed from the side surfaces of the multi-layer unit, in the multi-layer ceramic capacitor.

In view of the circumstances as described above, it is desirable to provide a multi-layer ceramic electronic component having optimal moisture resistance and a method of producing the multi-layer ceramic electronic component.

According to an embodiment of the present disclosure, there is provided a multi-layer ceramic electronic component including a multi-layer unit and a side margin.

The multi-layer unit includes ceramic layers laminated in a first direction, internal electrodes disposed between the ceramic layers, a main surface that faces in the first direction, and a side surface that faces in a second direction orthogonal to the first direction, the internal electrodes being exposed from the side surface.

The side margin includes a side-surface-covering portion that is disposed on the side surface, and an end portion that extends from the side-surface-covering portion to an upper side of the main surface, the end portion having a lower porosity than a porosity of the side-surface-covering portion, the end portion being rounded.

In this configuration, since the end portion of the side margin extends to the upper side of the main surface of the multi-layer unit, a path through which moisture infiltrates between the multi-layer unit and the side margin and reaches a region where the internal electrodes are disposed in the side surface of the multi-layer unit becomes long. This provides high moisture resistance to the multi-layer ceramic electronic component.

Further, since the end portion of the side margin has a low porosity, moisture is less likely to infiltrate into the end portion. Accordingly, the end portion of the side margin can inhibit moisture from passing therethrough even though the end portion is rounded and thus thinner than the side-surface-covering portion. This provides much higher moisture resistance to the multi-layer ceramic electronic component.

The end portion may have a porosity of 5% or less.

The side-surface-covering portion may have a thickness of 10 μm or more and may have a porosity of 10% or less.

In those configurations, the moisture resistance of the multi-layer ceramic electronic component can be further improved.

According to an embodiment of the present disclosure, there is provided a method of producing a multi-layer ceramic electronic component, the method including: producing a multi-layer unit including ceramic layers laminated in a first direction, internal electrodes disposed between the ceramic layers, and a side surface that faces in a second direction orthogonal to the first direction, the internal electrodes being exposed from the side surface; disposing a ceramic sheet on a base member, the base member having a Young's modulus of 10 kPa or more and 20 MPa or less, the Young's modulus being measured by a method conforming to JIS K 6251; and punching the ceramic sheet on the base member by the side surface of the multi-layer unit.

The base member may be made of a silicone-based elastomer.

This configuration can produce a multi-layer ceramic electronic component having optimal moisture resistance as described above.

It is possible to provide a multi-layer ceramic electronic component having optimal moisture resistance and a method of producing the multi-layer ceramic electronic component.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the figures.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
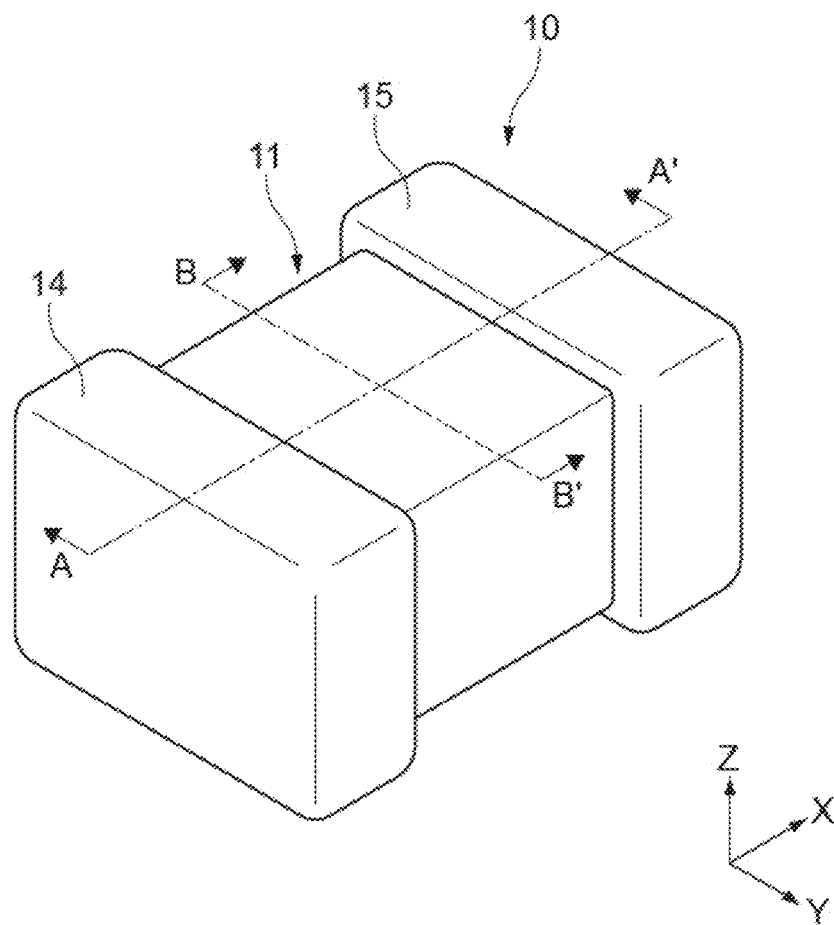
FIG. 1 is a perspective view of a multi-layer ceramic capacitor according to an embodiment of the present disclosure.
Figure 2:
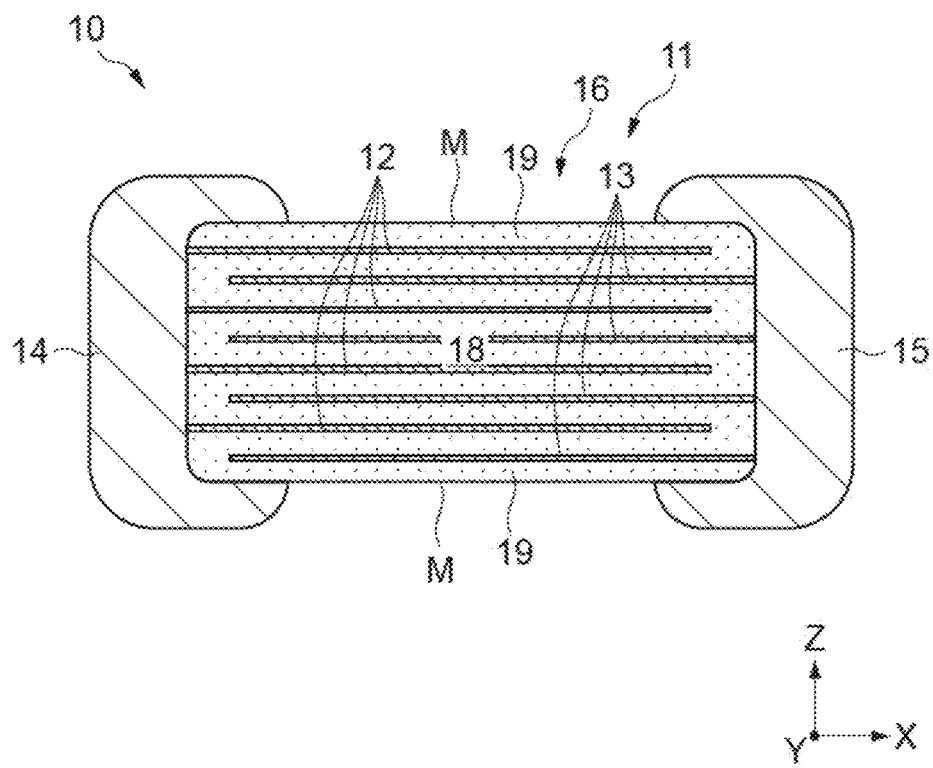
FIG. 2 is a cross-sectional view of the multi-layer ceramic capacitor taken along the A-A' line in FIG. 1.
Figure 3:
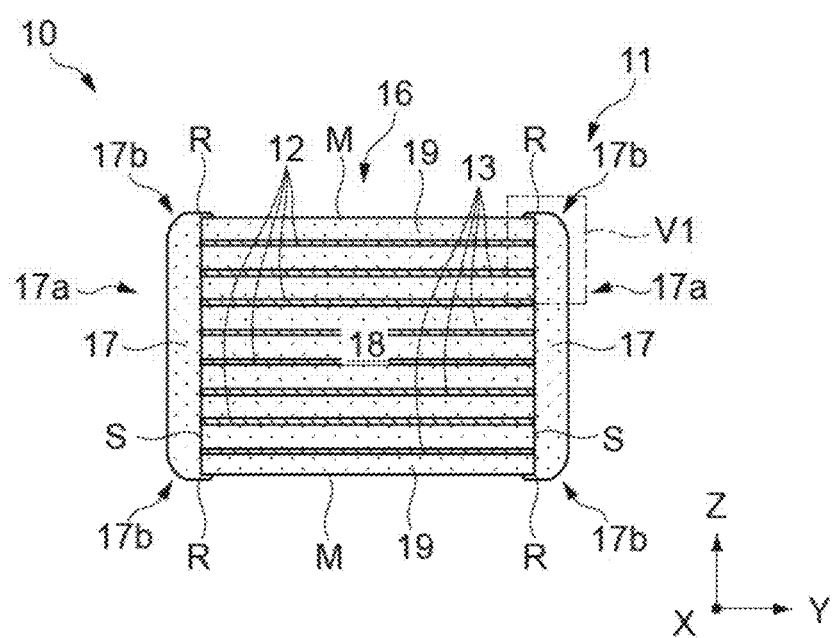
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 is formed as a hexahedron having two main surfaces facing in the Z-axis direction, two side surfaces facing in the Y-axis direction, and two end surfaces facing in the X-axis direction.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 may not extend to any of the main surfaces and the side surfaces.

The first and second external electrodes 14 and 15 are each formed of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is formed of dielectric ceramics and includes a multi-layer unit 16 and side margins 17. The multi-layer unit 16 has two main surfaces M facing in the Z-axis direction and two side surfaces S facing in the Y-axis direction. The side margins 17 cover the two side surfaces S of the multi-layer unit 16.

The multi-layer unit 16 has a configuration in which a plurality of flat plate-like ceramic layers extending along the X-Y plane are laminated in the Z-axis direction. The multi-layer unit 16 includes a capacitance forming unit 18 and covers 19. The covers 19 cover the capacitance forming unit 18 vertically in the Z-axis direction and constitute the two main surfaces M of the multi-layer unit 16.

The capacitance forming unit 18 includes a plurality of first internal electrodes 12 and a plurality of second internal electrodes 13 that are disposed between the plurality of ceramic layers. The first and second internal electrodes 12 and 13 each have a sheet-like shape extending along the X-Y plane. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

The first and second internal electrodes 12 and 13 are formed over the entire width of the capacitance forming unit 18 in the Y-axis direction and are exposed from both the side surfaces S of the multi-layer unit 16. In the ceramic body 11, the side margins 17 that cover both the side surfaces S of the multi-layer unit 16 ensure insulation properties between the first internal electrodes 12 and the second internal electrodes 13, which are adjacent to each other, in both the side surfaces S of the multi-layer unit 16.

The first internal electrodes 12 are drawn to one of the end portions of the ceramic body 11. The second internal electrodes 13 are drawn to the other end portion of the ceramic body 11. With this configuration, the first internal electrodes 12 are connected to only the first external electrode 14, and the second internal electrodes 13 are connected to only the second external electrode 15.

With such a configuration, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Thus, the multi-layer ceramic capacitor 10 stores charge corresponding to the voltage applied between the first external electrode 14 and the second external electrode 15.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that the multi-layer ceramic capacitor 10 according to this embodiment only needs to include the multi-layer unit 16 and the side margins 17, and other configurations of the multi-layer ceramic capacitor 10 can be changed as appropriate. For example, the number of first and second internal electrodes 12 and 13 can be determined as appropriate according to the size and performance expected for the multi-layer ceramic capacitor 10.

2. Detailed Configuration of Side Margin 17

As shown in FIG. 3, each of the side margins 17 includes a side-surface-covering portion 17a disposed at the center thereof in the Z-axis direction and end portions 17b disposed at both end portions thereof in the Z-axis direction. The side-surface-covering portion 17a is formed as a flat portion, which is formed to have a flat plate-like shape and has a substantially uniform thickness in the Y-axis direction. The end portions 17b extend outward in the Z-axis direction from the side-surface-covering portion 17a and slightly climb on the main surfaces M from the side surface S of the multi-layer unit 16.

Figure 4:
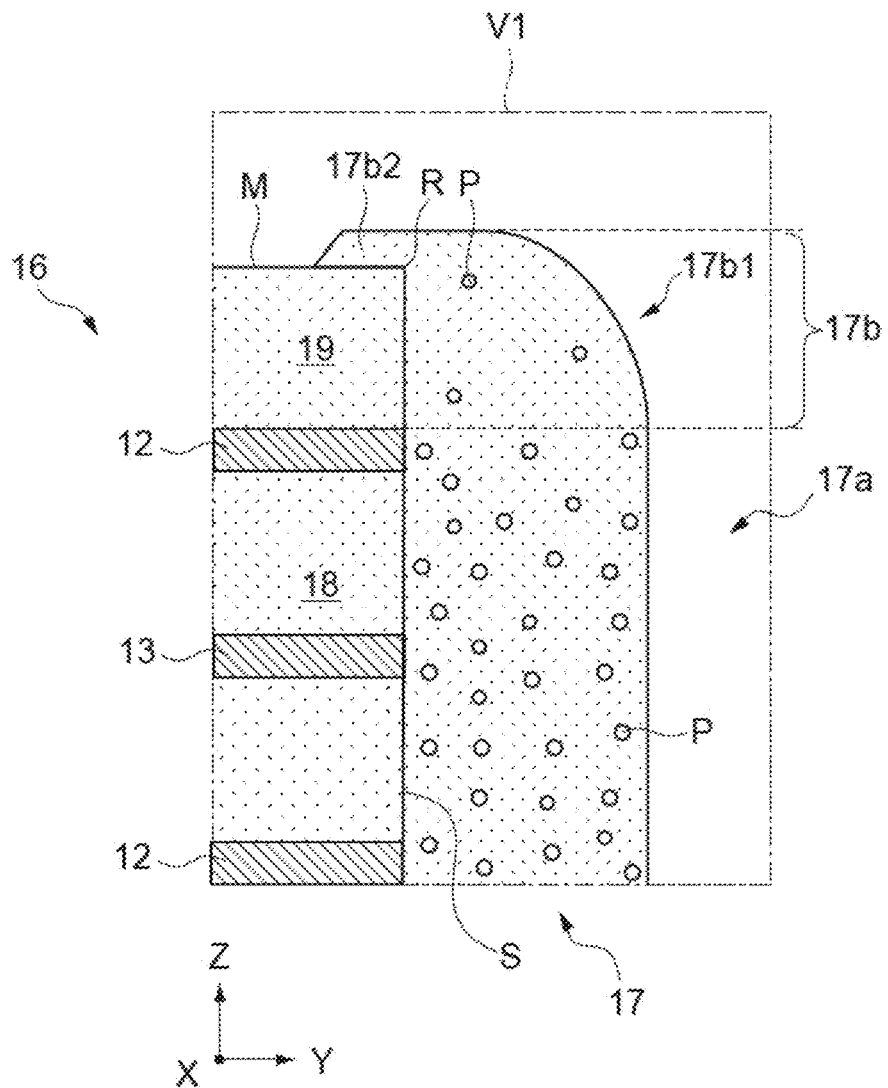
FIG. 4 is a partially enlarged cross-sectional view of a region V1 of the multi-layer ceramic capacitor shown in FIG. 3.

FIG. 4 is a partially enlarged cross-sectional view of a region V1 of the multi-layer ceramic capacitor 10, which is surrounded by a chain line of FIG. 3. In other words, FIG. 4 shows the vicinity of an end portion 17b of the side margin 17, which is shown in the upper right of FIG. 3. It should be noted that the other three end portions 17b of the side margins 17 are also configured to be similar to the end portion 17b shown in FIG. 4.

The boundary between the side-surface-covering portion 17a and the end portion 17b of the side margin 17 in the Z-axis direction corresponds to the boundary between the capacitance forming unit 18 and the cover 19. In other words, the end portion 17b is defined as an outward region in the Z-axis direction relative to the outermost layer of the first and second internal electrodes 12 and 13 in the Z-axis direction. The end portion 17b shown in FIG. 4 is disposed on the upper side in the Z-axis direction of the first internal electrode 12, which is uppermost in the Z-axis direction.

The end portion 17b of the side margin 17 includes a curved portion 17b1 and an extended portion 17b2. The curved portion 17b1 extends in the Z-axis direction from the side-surface-covering portion 17a to a ridge R connecting the side surface S and the main surface M of the multi-layer unit 16. The extended portion 17b2 is continuous from the curved portion 17b1 and extends inward in the Y-axis direction from the ridge R of the multi-layer unit 16 along the main surface M of the multi-layer unit 16.

In such a manner, the ridge R of the multi-layer unit 16 is covered with the end portion 17b of the side margin 17 and thus protected. Accordingly, in the ceramic body 11, external impact is not directly applied to the ridge R of the multi-layer unit 16. Therefore, in the ceramic body 11, damages such as a crack generated from the ridge R of the multi-layer unit 16 can be inhibited from occurring.

Further, the curved portion 17b1 of the side margin 17 is rounded. In other words, the outer surface of the curved portion 17b1 is curved so as to protrude outward. Therefore, an external force is less likely to be locally applied to the ridge of the ceramic body 11, which is formed by the end portion 17b of the side margin 17. Accordingly, high impact resistance is obtained in the multi-layer ceramic capacitor 10.

Furthermore, in the side margin 17, the amount of dispersion of pores P of the end portion 17b is smaller than that of the side-surface-covering portion 17a. In other words, in the side margin 17, a porosity of the end portion 17b is lower than a porosity of the side-surface-covering portion 17a. Here, the porosity is defined as a proportion of the areas of the pores P in an image where the cross section of the side margin 17 appears.

The porosity of the side-surface-covering portion 17a can be calculated in a region within a predetermined range extending in the Z-axis direction from the boundary with the end portion 17b. The predetermined range of the side-surface-covering portion 17a can be set to, for example, three times as large as the dimension of the side-surface-covering portion 17a in the Y-axis direction at the boundary with the end portion 17b. The porosity of the end portion 17b can be calculated in the entire region of the end portion 17b.

With this configuration, moisture is less likely to infiltrate into the inside of the end portion 17b. Therefore, as a distance from the side-surface-covering portion 17a increases, the end portion 17b has a smaller thickness, but the end portion 17b can inhibit moisture from passing therethrough in the Y-axis direction. This can provide high moisture resistance to the multi-layer ceramic capacitor 10.

In the side margin 17, it is favorable that the end portion 17b has a porosity of 5% or less. Further, it is more favorable that the thickness of the side-surface-covering portion 17a in the Y-axis direction is 10 μm or more and the side-surface-covering portion 17a has a porosity of 10% or less. With those configurations, the moisture resistance of the multi-layer ceramic capacitor 10 is further improved.

Further, in the side margin 17, the end portion 17b seamlessly extends from the side surface S to the main surface M of the multi-layer unit 16. In other words, a path through which moisture infiltrates between the multi-layer unit 16 and the side margin 17 and reaches the capacitance forming unit 18 is extended by the length of the extended portion 17b2 and is bent at the ridge R of the multi-layer unit 16.

This makes it difficult for moisture to reach the capacitance forming unit 18 in the multi-layer ceramic capacitor 10. In the side margin 17, in order to effectively obtain the action of extending such a moisture infiltration path, it is favorable that the extended amount of the extended portion 17b2 inward in the Y-axis direction relative to the side surface S of the multi-layer unit 16 is set to 5 μm or more.

In such a manner, in the multi-layer ceramic capacitor 10, the action of the end portion 17b of the side margin 17 makes it possible to suppress infiltration of moisture into a region where the capacitance forming unit 18 is disposed in the side surface S of the multi-layer unit 16. Therefore, high moisture resistance can be obtained in the multi-layer ceramic capacitor 10.

3. Method of Producing Multi-Layer Ceramic Capacitor 10

Figure 5:
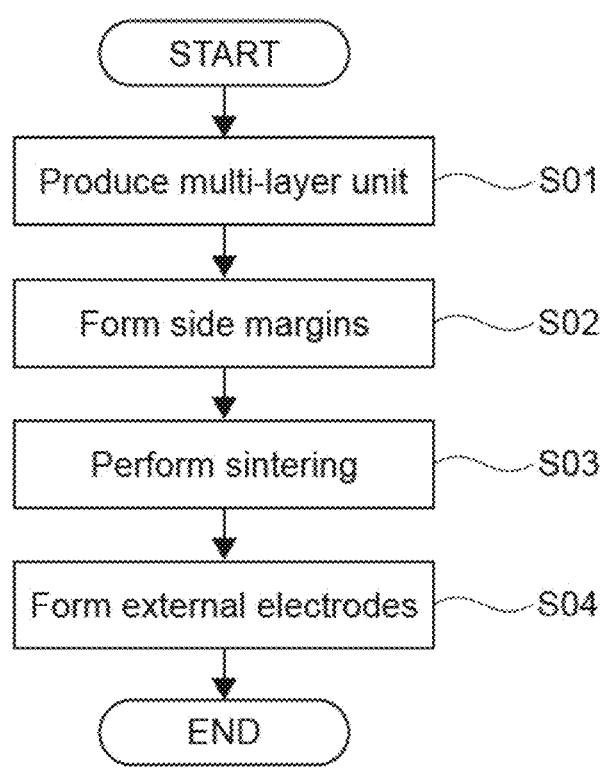
FIG. 5 is a flowchart showing a method of producing the multi-layer ceramic capacitor.

FIG. 5 is a flowchart showing a method of producing the multi-layer ceramic capacitor 10. FIGS. 6 to 10 are views each schematically showing a production process of the multi-layer ceramic capacitor 10. Hereinafter, the method of producing the multi-layer ceramic capacitor 10 will be described according to FIG. 5 with reference to FIGS. 6 to 10 as appropriate.

3.1 Step S01: Production of Multi-Layer Unit

Figure 6:
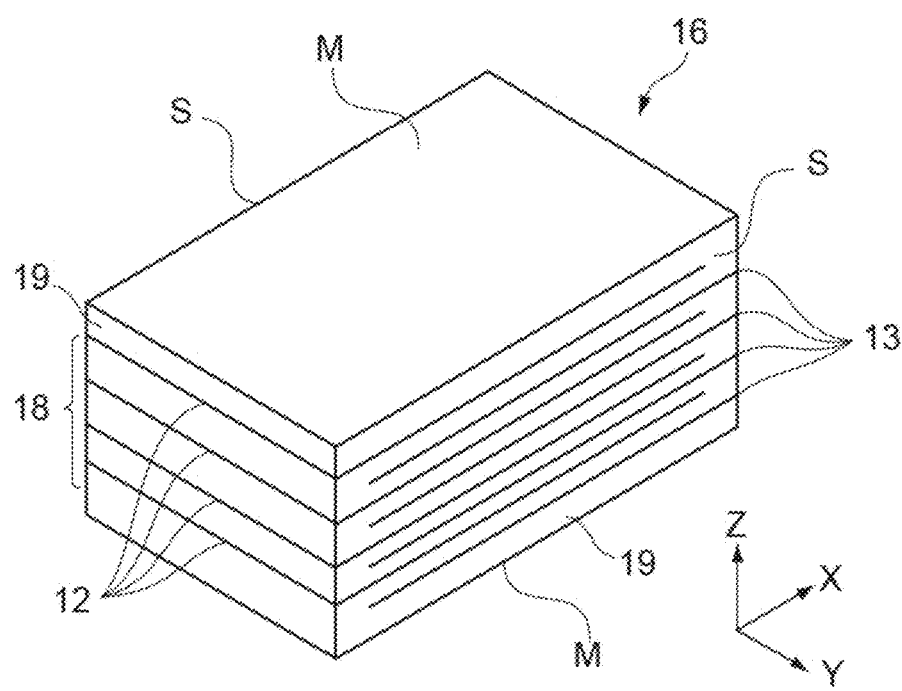
FIG. 6 is a perspective view of an unsintered multi-layer unit produced in Step S01 of the production method described above.

In Step S01, an unsintered multi-layer unit 16 shown in FIG. 6 is produced. The multi-layer unit 16 includes a plurality of laminated unsintered dielectric green sheets on which the first and second internal electrodes 12 and 13 are patterned as appropriate. With this configuration, an unsintered capacitance forming unit 18 and unsintered covers 19 are formed in the multi-layer unit 16.

3.2 Step S02: Formation of Side Margins

In Step S02, unsintered side margins 17 are provided to the side surfaces S of the multi-layer unit 16 produced in Step S01, to produce an unsintered ceramic body 11. Hereinafter, description will be given on an example of a method of providing the unsintered side margins 17 to the side surfaces S of the multi-layer unit 16 in Step S02.

Figure 7:
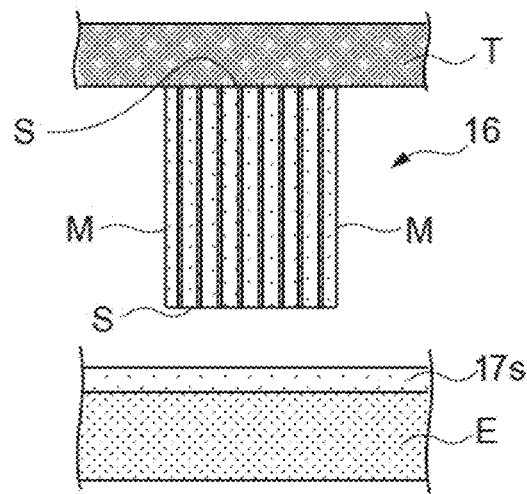
FIG. 7 is a cross-sectional view schematically showing Step S02 of the production method described above.

First, as shown in FIG. 7, a ceramic sheet 17s is disposed on a flat plate-like base member E, and one side surface S of the multi-layer unit 16, the other side surface S of which is held with a tape T, is caused to face the ceramic sheet 17s. The base member E is made of, for example, a soft material having a small Young's modulus, such as a silicone-based elastomer.

The ceramic sheet 17s is formed as a large-sized dielectric green sheet for forming the unsintered side margin 17. The ceramic sheet 17s can be formed into a flat sheet having a uniform thickness by using, for example, a roll coater or a doctor blade.

Figure 8:
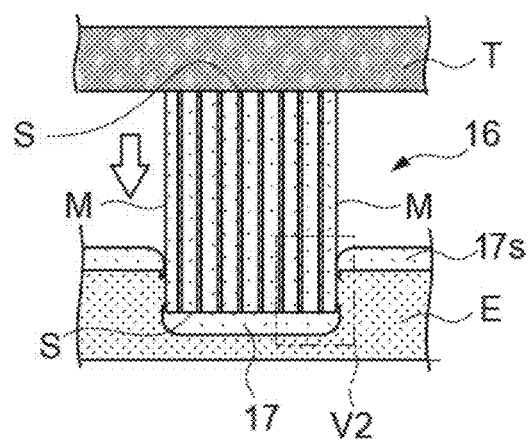
FIG. 8 is a cross-sectional view schematically showing Step S02 of the production method described above.

Next, as shown in FIG. 8, the ceramic sheet 17s is pressed by the side surface S of the multi-layer unit 16. The multi-layer unit 16 locally sinks deep into the base member E having a low Young's modulus together with the ceramic sheet 17s. With this configuration, the portion of the ceramic sheet 17s, which is sunk together with the multi-layer unit 16, is cut off as a side margin 17.

Figure 9:
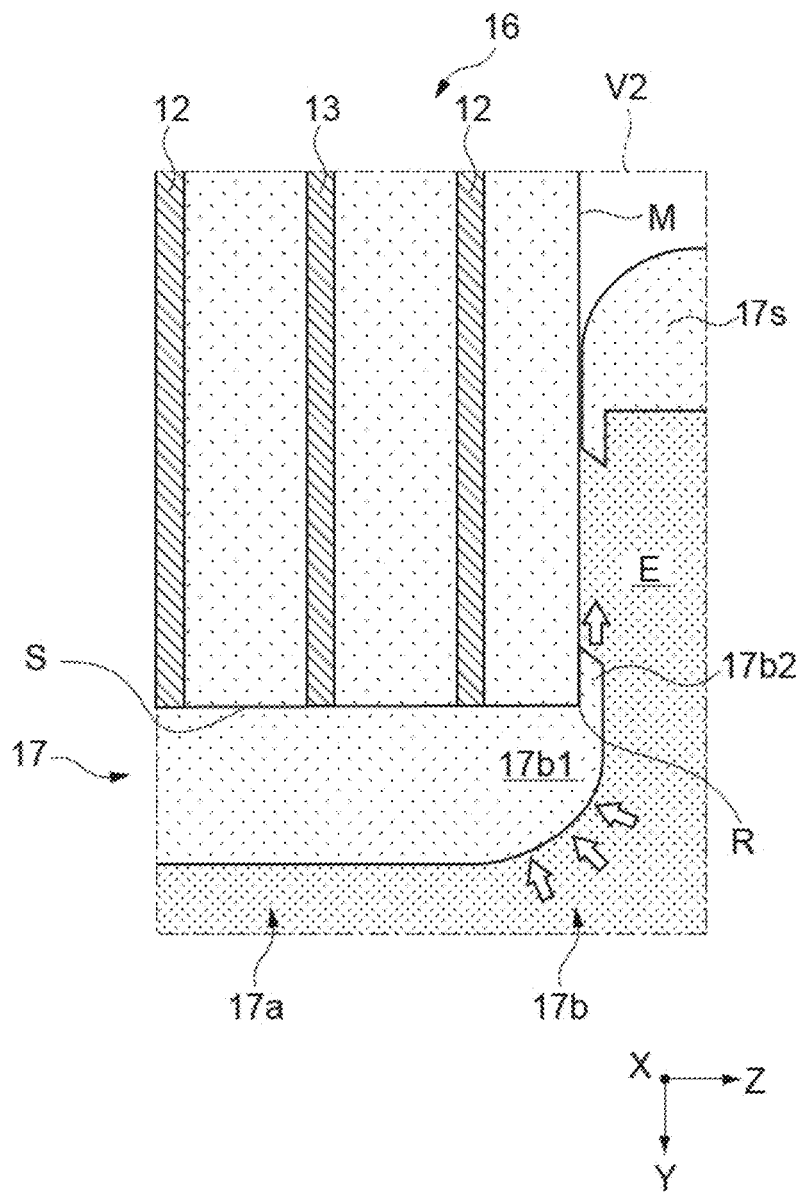
FIG. 9 is a partially enlarged cross-sectional view of a region V2 of FIG. 8.

FIG. 9 is a partially enlarged cross-sectional view of a region V2, which is surrounded by a chain line of FIG. 8. The side-surface-covering portion 17a of the side margin 17 receives a pressing force substantially uniform in the Y-axis direction while being sandwiched between the side surface S of the multi-layer unit 16 and the base member E. Accordingly, in the side-surface-covering portion 17a, the flat shape of the ceramic sheet 17s is maintained.

Meanwhile, the corner of the end portion 17b of the side margins 17 is removed and rounded by a pressing force applied from the base member E around the end portion 17b. This leads to the formation of the curved portion 17b1. Further, the end portion 17b is extended along the main surface M of the multi-layer unit 16 when being cut off from the ceramic sheet 17s. This leads to the formation of the extended portion 17b2.

In such a manner, in Step S02, plastic working is additionally performed on the curved portion 17b1 and the extended portion 17b2. In the curved portion 17b1 and the extended portion 17b2, voids gradually disappear in the course of plastic deformation, which progresses the densification. Accordingly, the curved portion 17b1 and the extended portion 17b2 that form the end portions 17b have a higher degree of compactness than that of the side-surface-covering portion 17a.

The Young's modulus of the base member E is favorably 10 kPa or more and 20 MPa or less, and more favorably, 10 kPa or more and 1 MPa or less. With this configuration, a shear force applied to the ceramic sheet 17s along the ridge R of the multi-layer unit 16 is suppressed, and the curved portion 17b1 and the extended portion 17b2 can be optimally formed.

Figure 10:
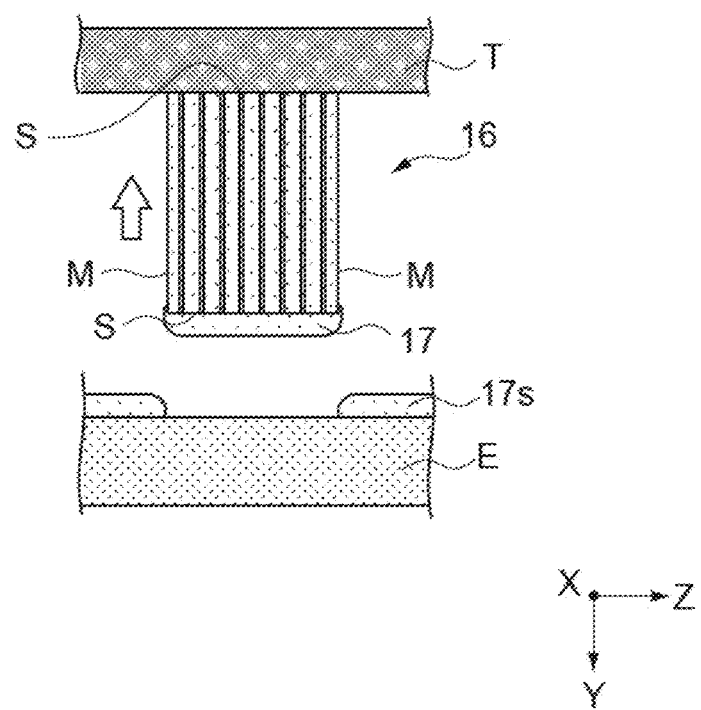
FIG. 10 is a cross-sectional view schematically showing Step S02 of the production method described above.

When the multi-layer unit 16 is moved upward in the Y-axis direction so as to separate from the base member E as shown in FIG. 10, only the part of the side margin 17, which is attached to the side surface S of the multi-layer unit 16, separates from the base member E. With this configuration, the side margin 17 is formed on one side surface S of the multi-layer unit 16.

Subsequently, the orientation of the side surface S of the multi-layer unit 16 in the Y-axis direction is inverted by transferring the multi-layer unit 16 to a tape different from the tape T shown in FIG. 10. In the manner similar to the above, the side margin 17 is formed also on the side surface S on the other side of the multi-layer unit 16, on which the side margin 17 is not formed. This provides an unsintered ceramic body 11.

It should be noted that a method of forming the side margins 17 is not limited to the above method as long as the end portion 17b including the curved portion 17b1 and the extended portion 17b2 can be formed. For example, the side margins 17, which are formed on the side surfaces S of the multi-layer unit 16 by an optional publicly known technique, may be subjected to ex-post plastic working to form the curved portion 17b1 and the extended portion 17b2.

3.3 Step S03: Sintering

In Step S03, the unsintered ceramic body 11 obtained in Step S02 is sintered to produce the ceramic body 11 of the multi-layer ceramic capacitor 10 shown in FIGS. 1 to 3. In the side margins 17 of the ceramic body 11, the porosity of the end portions 17b having a higher degree of compactness is lower than the porosity of the side-surface-covering portion 17a.

A sintering temperature in Step S03 can be determined on the basis of a sintering temperature for the ceramic body 11. For example, when a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

3.4 Step S04: Formation of External Electrodes

In Step S04, the first external electrode 14 and the second external electrode 15 are formed on both the end portions of the ceramic body 11 in the X-axis direction obtained in Step S03, to produce the multi-layer ceramic capacitor 10 shown in FIGS. 1 to 3. A method of forming the first external electrode 14 and the second external electrode 15 in Step S04 is optionally selectable from publicly known methods.

By the above steps, the multi-layer ceramic capacitor 10 is completed. In this production method, the side margins 17 are provided to the side surfaces S, from which the first and second internal electrodes 12 and 13 are exposed, of the multi-layer unit 16 in a subsequent step. Thus, the positions of the end portions of the first and second internal electrodes 12 and 13 in the Y-axis direction in the ceramic body 11 are aligned with one another along the Z-axis direction with variations of 0.5 μm or less.

4. Other Embodiments

While the embodiment of the present disclosure has been described, the present disclosure is not limited to the embodiment described above, and it should be appreciated that the present disclosure may be variously modified.

For example, in the embodiment described above, the multi-layer ceramic capacitor 10 has been described as an example of a multi-layer ceramic electronic component, but the present disclosure can be applied to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising a multi-layer unit including ceramic layers laminated in a first direction, internal electrodes disposed between the ceramic layers, a main surface that faces in the first direction, a side surface that faces in a second direction orthogonal to the first direction, the internal electrodes being exposed from the side surface, and a ridge connecting the side surface and the main surface; and a side margin including a side-surface-covering portion that is disposed on a center of the side surface in the first direction, and an end portion that extends in the first direction from the side-surface-covering portion to the ridge and extends in the second direction from the ridge to a region of the main surface, wherein the end portion is in direct contact with the main surface, wherein the end portion covers a portion of the side surface from the second direction, wherein the end portion covers the ridge, wherein the end portion covers the region of the main surface from the first direction, wherein the end portion has a lower porosity than a porosity of the side-surface-covering portion, and wherein the end portion is rounded.

2. The multi-layer ceramic electronic component according to claim 1, wherein the end portion has a porosity of 5% or less.

3. The multi-layer ceramic electronic component according to claim 1, wherein
the side-surface-covering portion has a thickness of 10 μm or more, and
the side-surface-covering portion has a porosity of 10% or less.

* * * * *